April 23, 1957     J. K. GOERNER ET AL     2,790,007
DECOBALTING OF ALDEHYDES IN THE OXO PROCESS
Filed Nov. 19, 1954
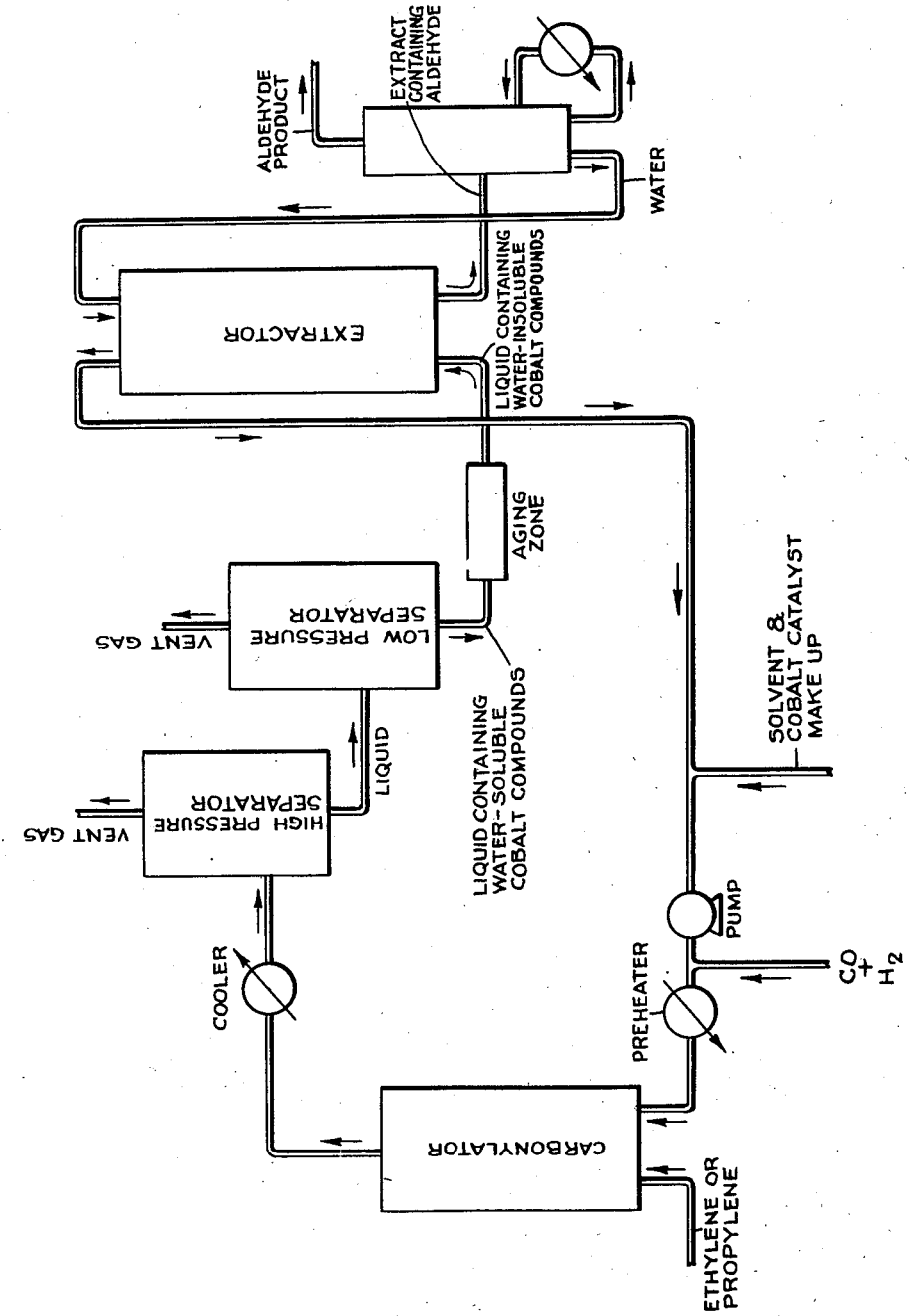
INVENTOR
Joseph Kofahi Goerner
James Foster Bone
BY
Benjamin Sweedler
ATTORNEY

United States Patent Office 2,790,007
Patented Apr. 23, 1957

2,790,007

DECOBALTING OF ALDEHYDES IN THE OXO PROCESS

Joseph Kofahl Goerner and James Foster Bone, Austin, Tex., assignors to Jefferson Chemical Company, Inc., New York, N. Y., a corporation of Delaware Application November 19, 1954, Serial No. 470,001

10 Claims. (Cl. 260—604)

This invention relates to the production of oxygenated organic compounds by the so-called oxo process, and more particularly to the recovery from the reaction mixture produced in the carbonylation step of the desired aldehyde product and the carbonylation catalyst, the latter in a re-usable form.

In the carbonylation of olefins with synthesis gas consisting of carbon monoxide and hydrogen, in the presence of a cobalt catalyst and an inert water-immiscible solvent, such as toluene, a carbonylation mixture consisting chiefly of the solvent, aldehyde and cobalt catalyst is produced. The mechanism of the catalysis is not fully known. It is believed that the active catalyst is a labile cobalt compound which may be produced in the reaction zone from cobalt or one of the cobalt carbonyls which are invariably present under the temperature and pressure conditions employed in carrying out the carbonylation step.

It has been proposed to recover the cobalt catalyst and the aldehyde from such reaction mixtures by subjecting them to a thermal or acid decobalting, followed by subsequent distillation to recover the product. Such procedures involve decomposition of all of the catalyst in the reaction mixture, followed by a regeneration of the catalyst and are therefore involved and costly.

It has also been proposed to subject the carbonylation mixture to flash distillation to distill off the aldehyde. Such distillation procedures must be carried out under carefully controlled conditions of temperature and pressure, to prevent catalyst decomposition or product loss, and are therefore costly to carry out.

It is among the objects of this invention to provide a process for treating carbonylation mixtures containing three or four carbon atom aldehydes, which process does not involve the disadvantages of the above described prior known procedures, and which process can be carried out readily and economically to recover the aldehyde product and the cobalt catalyst in a re-usable form.

Other objects and advantages of this invention will be apparent from the following detailed description thereof.

In accordance with this invention, a carbonylation mixture produced by treating ethylene or propylene with synthesis gas in the presence of an inert solvent and a cobalt catalyst, after conversion of the cobalt catalyst to a form in which it is water-insoluble, is extracted with water to produce an aqueous extract containing most of the aldehyde and a raffinate containing the solvent and the cobalt catalyst. This extract can be distilled to produce substantially pure aldehyde. The raffinate can be recycled to the carbonylator without extraneous treatment for re-use in the process.

As the inert solvent, toluene is preferred, although other solvents, such as benzene, xylene, ethylbenzene, cumene and commercial aliphatic hydrocarbon solvents in the pentane-decane range may be used. In fact, any hydrocarbon solvent which is free of olefinic and acetylenic unsaturation and which is liquid under the conditions of temperature and pressure employed in the process may be used.

The synthesis gas employed may contain hydrogen and carbon monoxide in a ratio of 1 to 1, although mixtures containing hydrogen and carbon monoxide in ratios varying from 0.5 to 3.0 may be used.

The carbonylation reaction is exothermic and is desirably carried out while cooling the reaction mixture maintaining a temperature of from 300° to 360° F., preferably about 340° F. The reaction is carried out under a pressure of from 500 to 5,000 p. s. i. g., preferably about 3,000 to 3,500 p. s. i. g.

The catalyst employed in the reaction is a cobalt compound produced by reacting, for example, cobalt acetate, cobalt carbonate, hydroxide, or oxide, in the presence of a suitable solvent for the cobalt catalyst, such, for example, as propanol, with synthesis gas at elevated temperatures and pressures corresponding to those employed in the carbonylation step. The cobalt catalyst could, for example, be produced in the carbonylator by introducing a cobalt salt, such as cobalt acetate or other cobalt compound, into the carbonylator where it reacts with the synthesis gas to produce the catalyst. The catalyst is believed to be chiefly cobalt hydrocarbonyl, which is appreciably water-soluble. However, upon standing in the absence of hydrogen, cobalt hydrocarbonyl or other water-soluble cobalt carbonyl compounds present readily change to cobalt carbonyls which are water-insoluble.

The carbonylation reaction mixture is fed from the carbonylator through a cooler where it is cooled to from 40° to 100° F., preferably about 100° F., and then introduced into a high-pressure separator where some of the unreacted gas is separated from the liquid in the reaction mixture. Desirably, the high-pressure separator is maintained at a pressure of about 10 to 50 p. s. i. g. below the pressure in the carbonylator.

From the high-pressure separator the reaction mixture passes into a low-pressure separator maintained at a pressure of from 5 to 200 p. s. i. g., where separation of the liquid from the gas takes place. The gas consisting chiefly of unreacted carbon monoxide, hydrogen and ethane or propane is separated from the liquid and is in part recycled to the process by admixture with the synthesis gas fed to the carbonylator and in part purged from the process.

The liquid product from the low-pressure separator consisting chiefly of aldehyde, solvent and cobalt catalyst, is then subjected to aging to convert the water-soluble cobalt compounds, chiefly believed to be cobalt hydrocarbonyl, to water-insoluble cobalt compounds, chiefly cobalt carbonyls. This may be accomplished by passing the liquid product into a so-called "soaking tank" where it is permitted to remain at from 40° to 100° F. for long enough for such conversion to take place, or by having the flow path through which the liquid flows to the extractor of sufficient extent to permit this conversion to take place. In general, aging of the liquid for about 1 to 5 hours, i. e., providing a flow path or soaking or storage zone of a capacity such that each particle of liquid product is aged for a period of from 1 to 5 hours after leaving the low-pressure separator and before entering the extractor, will suffice to insure that the desired conversion of water-soluble cobalt compounds into water-insoluble cobalt compounds has taken place. This aging treatment is preferably carried out under a small pressure of carbon monoxide (e. g., 5 to 100 p. s. i. g.) and in the absence of substantial amounts of hydrogen.

The extraction of the liquid product with water is preferably carried out continuously in any suitable extraction tower, such as a spray tower, packed tower, Scheibel column, etc. Either the carbonylation liquid or the water phase may be continuous. It is preferred, however, to have the water phase continuous. The extraction is preferably carried out at atmospheric temperatures, although temperatures up to 200° F. may be used, if desired. It is carried out under a small pressure of carbon monoxide, preferably of from 5 to 100 p. s. i. g. and preferably in the absence of substantial amounts of hydrogen, to prevent decomposition of the cobalt carbonyl compounds. When operating in the higher portion of this temperature range, carbon monoxide pressures in the higher portion of the aforementioned pressure range should be employed to minimize decomposition of cobalt carbonyls to cobalt metal.

From the extractor the aqueous extract containing extracted propionaldehyde is subjected to fractional distillation to recover the aldehyde overhead as a substantially pure product. Water containing trace amounts of cobalt compounds is removed from the bottom of the column and after cooling may be used in the extraction step. Most of the cobalt in the water-extract phase appears to be present as the formate and proprionate (when ethylene is being carbonylated) or the formate and butyrate (when propylene is being carbonylated). These cobalt values may be recovered by concentrating a portion of the water stream and injecting the resulting concentrated cobalt solution into the carbonylator as part of the cobalt make-up.

The raffinate from the extractor containing the cobalt catalyst is recycled to the carbonylator.

The accompanying drawing shows a preferred arrangement of the equipment, illustrated diagrammatically, for practicing the process of this invention. The legends on this drawing are self-explanatory. In view of these legends and the above description of the process it is believed that further description of the drawing is unnecessary.

The following example of the production of proprionaldehyde from ethylene and synthesis gas in the presence of a cobalt catalyst and toluene diluent is given for purposes of illustration only. It will be understood that the invention is not limited to this example, but includes the production of butyraldehyde or mixtures of propionaldehyde and butyraldehyde from propylene and mixtures of ethylene and propylene respectively:

Example

The carbonylator is maintained at a temperature of 340° F. and a pressure of 3,200 p. s. i. g. As the reaction is exothermic the temperature of 340° F. is maintained by circulating a suitable cooling medium through the jacket of the carbonylator. Ethylene preheated to 340° F. at a pressure of 3,200 p. s. i. g., and a mixture of synthesis gas ($CO:H_2=1:1$ on a molar basis), and toluene at a pressure of 3,200 p. s. i. g. are fed to the carbonylator. Make-up cobalt carbonyl catalyst and cobalt carbonyl from the extractor are introduced into the carbonylator along with the synthesis gas and the toluene diluent, as indicated in the accompanying drawing. In the carbonylator the cobalt carbonyl is converted to water-soluble cobalt compounds, chiefly cobalt hydrocarbonyl. The carbonylation is carried out as a homogeneous liquid phase reaction catalyzed by the dissolved cobalt hydrocarbonyl.

The ethylene is supplied continuously at the rate of 49 s. c. f. h. (standard cubic feet per hour; by standard, of course, is meant at 1 atmosphere pressure and 60° F.) and the synthesis gas at the rate of 135 s. c. f. h. The solution of cobalt catalyst from the extractor is recycled to the carbonylator at the rate of 22.2 lbs./hr. Make-up catalyst solution containing approximately 3% cobalt carbonyl is supplied at the rate of 0.15 lb./hr. The reaction mixture is withdrawn from the carbonylator at the rate of 26.3 lbs/hr. at a temperature of 340° F., cooled to 100° F., passed into the high-pressure separator at a pressure of 3,150 p. s. i. g, and then into the low-pressure separator where the pressure is reduced to 80 p. s. i. g. From the low-pressure separator the gas is withdrawn at the rate of 22 s. c. f. h. and the liquid at the rate of 26.3 lbs./hr. The liquid from the low-pressure separator, after aging for 4 hours thus converting most water-soluble cobalt compounds to water-insoluble compounds and at a temperature of 100° F., is passed continuously into the extractor at a rate of 26.3 lbs./hr. Raffinate containing cobalt catalyst is withdrawn at the rate of 22.2 lbs./hr. and returned to the carbonylator, as hereinabove described. The extract is withdrawn from the extractor at a rate of 133.5 lbs./hr. and passed into a fractionating column where it is distilled.

Propionaldehyde containing about 1.9% water by weight is taken off overhead. The bottoms stream consisting of practically pure water is returned to the extraction column for re-use.

It will be noted that the present invention provides a process for treating carbonylation mixtures, which results in the direct recovery of the cobalt catalyst in re-usable form. The process of this invention can be carried out simply and economically. It does not require the carefully controlled conditions of temperature and pressure to prevent decomposition of the cobalt catalyst and product loss as in the case of certain prior known procedures, such, for example, as the flash distillation procedure heretofore suggested for treatment of carbonylation mixtures, to recover the cobalt catalyst and the aldehyde.

It is to be understood that this invention is not restricted to the present disclosure otherwise than as defined by the appended claims.

What is claimed is:

1. In a process of producing an aldehyde of the group consisting of propionaldehyde and butyraldehyde by reacting an olefin from the group consisting of ethylene and propylene with synthesis gas in the presence of a water-soluble cobalt catalyst, the improvement which comprises aging the reaction mixture until said water-soluble cobalt catalyst is substantially converted to water-insoluble cobalt compounds, and extracting the reaction mixture with water to produce an aqueous mixture containing the aldehyde and a raffinate containing the water insoluble cobalt compounds.

2. A process of producing an aldehyde of the group consisting of propionaldehyde and butyraldehyde by reacting an olefin from the group consisting of ethylene and propylene with carbon monoxide and hydrogen and in the presence of a cobalt catalyst and an inert solvent for the cobalt catalyst to produce a reaction mixture containing said aldehyde, cobalt catalyst, solvent and unreacted carbon monoxide and hydrogen under elevated pressures, which process comprises reducing the pressure on said reaction mixture, separating the liquid from the carbon monoxide and hydrogen, aging the separated liquid for a period sufficient to convert water-soluble cobalt compounds to water-insoluble compounds, extracting the aged liquid with water to form an aqueous solution of the aldehyde and a raffinate containing the water-insoluble cobalt compounds, and using the raffinate to supply at least a portion of the cobalt catalyst utilized in said reaction.

3. The process as defined in claim 2, in which the extraction of said liquid with water is carried out under a pressure of carbon monoxide of from 5 to 100 p. s. i. g.

4. A process of producing propionaldehyde by reacting ethylene with carbon monoxide and hydrogen in the presence of a cobalt catalyst and an inert solvent for the cobalt catalyst to produce a reaction mixture containing propionaldehyde, cobalt catalyst, said solvent and unreacted carbon monoxide and hydrogen under elevated pressures, which process comprises reducing the pressure on said reaction mixture, separating the liquid from the carbon monoxide and hydrogen, aging the separated liquid for a period sufficient to convert water-soluble cobalt compounds to water-insoluble cobalt compounds, extracting the aged liquid with water to form an aqueous solution of the propionaldehyde and a raffinate containing water-insoluble cobalt compounds and solvent, and utilizing the raffinate to supply at least a portion of the cobalt catalyst and solvent employed in the reaction.

5. The process as defined in claim 4, in which the extraction of said liquid with water is carried out under a pressure of carbon monoxide of from 5 to 100 p. s. i. g.

6. A process according to claim 1 in which said aging is conducted in the absence of added water.

7. The process of treating a carbonylation reaction mixture comprising an aldehyde, from the group consisting of propionaldehyde and butyraldehyde, a water-soluble cobalt catalyst and an inert solvent, which comprises aging said reaction mixture at a temperature of about 40° to 100° F. until said water-soluble cobalt catalyst is substantially converted to a water-insoluble cobalt catalyst, and extracting said mixture with water to produce an aqueous mixture containing said aldehyde and the raffinate containing said inert solvent and said water insoluble cobalt catalyst dissolved therein.

8. A process according to claim 7 in which said aging is conducted in the absence of added water.

9. A process according to claim 7 in which said aging is conducted under about 5 to 100 p. s. i. g. of carbon monoxide.

10. A process according to claim 7 in which said aging is conducted for a period of about 1 to 5 hours.

References Cited in the file of this patent

UNITED STATES PATENTS

| | | |
|---|---|---|
| 2,679,534 | Koontz | May 25, 1954 |
| 2,686,206 | Cerveny | Aug. 10, 1954 |